Feb. 13, 1923.

A. J. KOKESH.
OILER.
FILED JUNE 1, 1921.

1,445,518.

Inventor
Alois J. Kokesh,
By
Attorney

Patented Feb. 13, 1923.

1,445,518

UNITED STATES PATENT OFFICE.

ALOIS J. KOKESH, OF CAINESVILLE, MISSOURI.

OILER.

Application filed June 1, 1921. Serial No. 474,129.

*To all whom it may concern:*

Be it known that ALOIS J. KOKESH, a citizen of the United States of America, residing at Cainesville, in the county of Harrison and State of Missouri, has invented new and useful Improvements in Oilers, of which the following is a specification.

The object of the invention is to provide a simple and efficient means for carrying on an automobile or similar vehicle a reserve supply of oil from which the crank case may be replenished from time to time as required merely by the manual operation of a suitable valve, instead of carrying a reserve supply in a bottle or can in the tool box or boot of the vehicle or depending upon the charge in the crank case and oil cups to supply oil for the trip; and with this object in view the invention consists in a construction and combination of parts of which a preferred embodiment is shown in the accompanying drawings, wherein:

Figure 1:
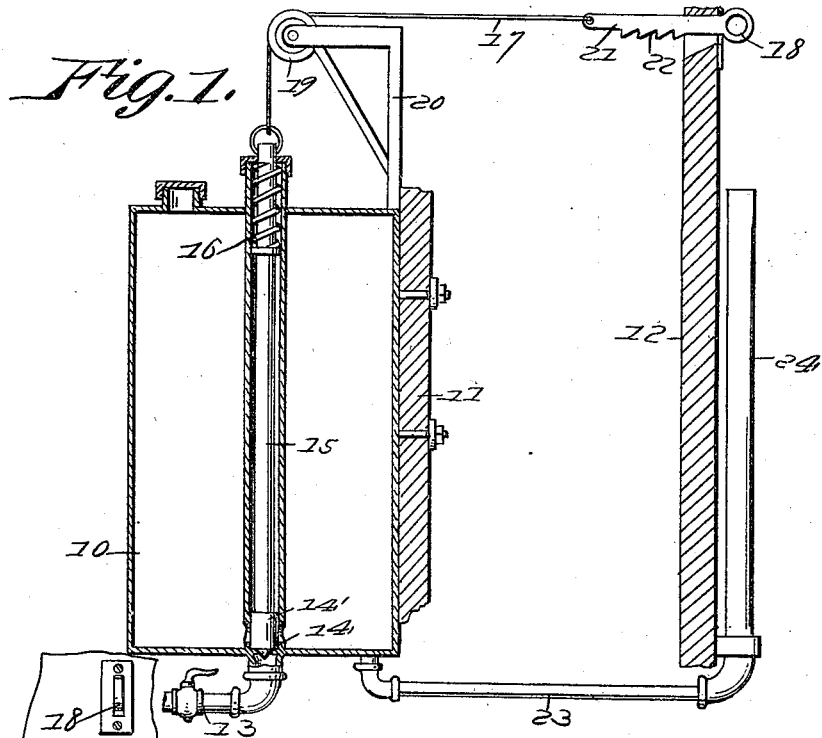
Figure 1 is a sectional view of an oiling apparatus embodying the invention applied in the operative position to a vehicle of which a portion is indicated in outline.
Figure 2:
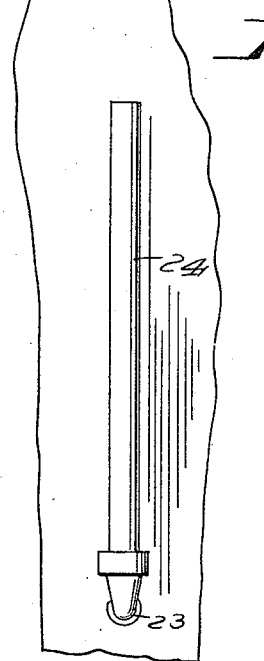
Figure 2 is a face view of the indicator which is located within convenient view of the operator of the dash board of the vehicle.

The apparatus consists essentially of an oil reservoir 10 which may have any desired capacity according to the preference of the driver of the vehicle attached by a suitable support 11 in the hood of the vehicle in front of the dash board indicated at 12 and provided with a suitable supply opening 13 fitted with a removable cap by means of which the reservoir may be filled.

Extending from the reservoir is a suitable feed pipe 13 leading to the crank case of the vehicle engine and being controlled by a valve 14 of which the stem 15 is actuated by a spring 16 to normally hold the valve seated.

Connected with the stem of the valve is a suitable cord or chain 17 terminating in a grip 18, said cord or chain extending over a direction pulley 19 supported by a suitable bracket 20. The grip may be provided with a shank 21 having a rack 22 for locking the same in position to maintain the valve unseated while a sufficient quantity of oil flows from the reservoir into the crank case.

Also in communication with the bottom of the reservoir by means of a suitable tube 23 is a gauge 24 of glass or other transparent material constituting an indicator and serving to indicate the level of the oil in the reservoir and also the quantity or depth of oil discharged from the reservoir into the crank case at each opening of the feed valve.

The grip 18 being arranged within convenient reach of the driver of the vehicle may be operated from time to time as required to supply oil to the crank case and thus maintain the parts of the motor properly lubricated without necessitating the stopping of the machine and the introduction of oil from a bottle or can as in the ordinary practice, and a further object of the apparatus resides in the fact that the surplus or reserve supply of oil is carried in convenient relation to the motor where it is maintained at a proper temperature regardless of the weather conditions and does not obstruct the interior of the vehicle or involve the risk of breakage of the receptacle and the consequent loss of the lubricating oil.

Having described the invention, what is claimed as new and useful is:—

In an oiling apparatus for the purpose specified, the combination with an auto vehicle having a dash, and a driving motor, of an oil reservoir mounted under the vehicle hood and having a permanent feed pipe connection with the motor crank case, a tubular member extending through the reservoir and communicating at its lower end with the feed pipe and with the interior of the reservoir, a valve engaged on a seat formed at the point of connection between the feed pipe and the reservoir, the valve having a stem extending through the tubular member, a spring in surrounding relation to the stem adjacent the upper end of the tubular member and operating to keep the valve normally seated, a hand grip passing slidably through an opening formed in the dash, a flexible member extending from the hand grip to the valve stem, and a direction pulley over which said flexible member is trained, the hand grip having a rack of which the teeth may be selectively engaged with the opening in the dash to maintain the valve in variously adjusted open position.

In testimony whereof he affixes his signature.

ALOIS J. KOKESH.